(12) United States Patent
Wright

(10) Patent No.: US 12,010,216 B2
(45) Date of Patent: *Jun. 11, 2024

(54) COMPUTER-IMPLEMENTED SYSTEM AND METHOD FOR HIGHLY SECURE, HIGH SPEED ENCRYPTION AND TRANSMISSION OF DATA

(71) Applicant: nChain Licensing AG, Zug (CH)

(72) Inventor: Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/064,804

(22) Filed: Dec. 12, 2022

(65) Prior Publication Data

US 2023/0188325 A1    Jun. 15, 2023

Related U.S. Application Data

(63) Continuation of application No. 16/639,101, filed as application No. PCT/IB2018/056116 on Aug. 15, 2018, now Pat. No. 11,528,127.

(30) Foreign Application Priority Data

Aug. 23, 2017   (GB) ..................... 1713499

(51) Int. Cl.
 *H04L 9/06*    (2006.01)
 *H04L 9/08*    (2006.01)
 (Continued)

(52) U.S. Cl.
 CPC .......... *H04L 9/0656* (2013.01); *H04L 9/0825* (2013.01); *H04L 9/0869* (2013.01);
 (Continued)

(58) Field of Classification Search
 CPC ........ G05B 19/406; G05B 2219/39315; G06N 3/08; G06N 3/0454; G06N 3/04;
 (Continued)

(56) References Cited

U.S. PATENT DOCUMENTS 5,991,405 A   11/1999  Mills
7,290,142 B1  10/2007  Yost
 (Continued)

FOREIGN PATENT DOCUMENTS

AU   2017223133 A1   8/2018
EP      1063811 A1  12/2000
 (Continued)

OTHER PUBLICATIONS

Dierks, T., et al., "The Transport Layer Security (TLS) Protocol Version 1.2", Network Working Gorup, Aug. 2008, 104 pages.
 (Continued)

*Primary Examiner* — Mohammed Waliullah
(74) *Attorney, Agent, or Firm* — Davis Wright Tremaine LLP

(57) ABSTRACT

The present disclosure relates to highly secure, high speed encryption methodologies suitable for applications such as media streaming, streamed virtual private network (VPN) services, large file transfers and the like. For example, encryption methodologies as described herein can provide stream ciphers for streaming data from, for example, a media service provider to a plurality of users. Certain configurations provide wire speed single use encryption. The methodologies as described herein are suited for use with blockchain (e.g. Bitcoin) technologies.

20 Claims, 4 Drawing Sheets

(51) Int. Cl.
*H04L 9/30* (2006.01)
*H04L 9/32* (2006.01)
*H04L 9/00* (2022.01)

(52) U.S. Cl.
CPC .......... *H04L 9/0872* (2013.01); *H04L 9/3066* (2013.01); *H04L 9/3239* (2013.01); *H04L 9/3252* (2013.01); *H04L 9/50* (2022.05)

(58) Field of Classification Search
CPC ......... G06T 7/0004; G06T 2207/20084; G06T 2207/30168
See application file for complete search history.

(56) References Cited

U.S. PATENT DOCUMENTS

| | | | |
|---|---|---|---|
| 7,502,933 | B2 | 3/2009 | Jakobsson et al. |
| 8,165,303 | B1 | 4/2012 | Steele et al. |
| 10,050,779 | B2 | 8/2018 | Alness et al. |
| 2003/0134107 | A1 | 7/2003 | Machida et al. |
| 2005/0138403 | A1 | 6/2005 | Volp et al. |
| 2006/0062384 | A1 | 3/2006 | Dondeti |
| 2006/0159267 | A1* | 7/2006 | Kim ........................ H04L 9/001 380/269 |
| 2008/0052533 | A1 | 2/2008 | Iida et al. |
| 2008/0095371 | A1 | 4/2008 | Vataja |
| 2009/0006858 | A1 | 1/2009 | Duane et al. |
| 2010/0191975 | A1 | 7/2010 | Chase et al. |
| 2011/0040473 | A1 | 2/2011 | Haft et al. |
| 2012/0151805 | A1 | 6/2012 | Polegato Moretti |
| 2013/0166080 | A1* | 6/2013 | Furuta ..................... G05B 13/02 700/286 |
| 2013/0251145 | A1 | 9/2013 | Lowans et al. |
| 2015/0156018 | A1 | 6/2015 | Ohya et al. |
| 2016/0050184 | A1* | 2/2016 | Ockenfels ............... H04L 12/06 713/171 |
| 2017/0195121 | A1 | 7/2017 | Frei et al. |
| 2018/0144114 | A1* | 5/2018 | Fiske ...................... G06F 21/32 |
| 2018/0183590 | A1* | 6/2018 | Kuo .......................... H04L 9/14 |

FOREIGN PATENT DOCUMENTS

| | | | |
|---|---|---|---|
| EP | 2962185 | A1 | 1/2016 |
| WO | 2004086673 | A1 | 10/2004 |

OTHER PUBLICATIONS

Menezes et al, "Chapter 12: Key Establishment Protocols ED," Handbook of Applied Cryptography, CRC Press Series on Discrete Mathematices and Its Applications, Oct. 1, 1996, 49 pages.

CryptoStackExchange, "Possible to Generate a One Time Secret Which All Nodes on the Distributed Network can Know but Cannot Pre Compute," retrieved from https://crypto.stackexchange.com/questions/32644/possible-to-generate-a-one-time-secretwhich- all-nodes-on-the-distributed-networ, Feb. 2016, 4 pages.

Fleischhacker et al., "Efficient Unlinkable Sanitizable Signatures from Signatures with Re-Randomizable Keys," ECCV, Feb. 18, 2016, 32 pages.

Hopwood et al., "Zcash Protocol Specification," retrieved from https://coindexter.s3.amazonaws.com/uploads/whitepaper/whitepaper/36/protocol.pdf, May 2017, 53 pages.

International Search Report and Written Opinion dated May 4, 2018, Patent Application No. PCT/IB2017/055073, 12 pages.

International Search Report and Written Opinion dated Oct. 17, 2018, Patent Application No. PCT/IB2018/056116, 12 pages.

Openssl Wiki, "Elliptic Curve Diffie Hellman," OpenSSL, https://wiki.openssl.org/index.php/Elliptic_Curve_Diffie_Hellman, Mar. 10, 2014 [retrieved Dec. 10, 2018], 5 pages.

Singh et al., "An Improved Algorithm for Designing Secure Point-to-Point Wireless Environment," SIJ Transactions on Computer Networks & Communication Engineering , 1(3): Jul.-Aug. 2013, 9 pages.

UK Commercial Search Report dated Jan. 12, 2018, Patent Application No. GB1713499.0, 9 pages.

UK IPO Search Report dated Jan. 18, 2018, Patent Application No. GB1713499.0, 7 pages.

Wang et al., "A Combinatorial Approach to Anonymous Membership Broadcast," Centre for Advanced Computing Algorithms and Cryptography, Aug. 2002, 9 pages.

Wikipedia, "Diffie-Hellman Key Exchange," retrieved from https://en.wikipedia.org/w/index.php?title=Diffie%E2%80%93Hellman_key_exchange&oldid=759611604, Jan. 2017, 10 pages.

Wikipedia, "Key Derivation Function," retrieved from https://en.wikipedia.org/w/index.php?title=Key_derivation_function&oldid=753893949, Dec. 2016, 9 pages.

Zyskind et al., "Decentralizing Privacy: Using a Blockchain to Protect Personal Data," 2015 IEEE CS Security and Privacy Workshops, May 21, 2015, 5 pages.

Satoshi et al., "Connection Limits," Bitcoin Forum, Aug. 9, 2010, https://bitcointalk.org/index.php?topic=741.0; prev_next=prev, 2 pages.

Nakamoto, "Bitcoin: A Peer-to-Peer Electronic Cash System," Bitcoin, Oct. 31, 2008, https://bitcoin.org/bitcoin.pdf, 9 pages.

Antonopoulos, "Mastering Bitcoin—Unlocking Digital Cryptocurrencies," O'Reilly Media, Inc., Dec. 20, 2014, 282 pages.

* cited by examiner

COMPUTER-IMPLEMENTED SYSTEM AND METHOD FOR HIGHLY SECURE, HIGH SPEED ENCRYPTION AND TRANSMISSION OF DATA

CROSS REFERENCE TO RELATED APPLICATIONS

This application is a continuation of U.S. patent application Ser. No. 16/639,101, filed Feb. 13, 2020, entitled "COMPUTER-IMPLEMENTED SYSTEM AND METHOD FOR HIGHLY SECURE, HIGH SPEED ENCRYPTION AND TRANSMISSION OF DATA," which is a 371 National Stage of International Patent Application No. PCT/IB2018/056116, filed Aug. 15, 2018, which claims priority to United Kingdom Patent Application No. 1713499.0, filed Aug. 23, 2017, and International Patent Application No. PCT/M2017/055073, filed Aug. 23, 2017, the disclosures of which are incorporated herein by reference in their entirety.

FIELD OF INVENTION

The present disclosure relates to highly secure, high speed encryption methodologies suitable for applications such as media streaming, streamed virtual private network (VPN) services, large file transfers and the like. For example, encryption methodologies as described herein can provide stream ciphers for streaming data from, for example, a media service provider to a plurality of users. Certain embodiments relate to wire speed single use encryption. The methodologies as described herein are suited for use with blockchain (e.g. Bitcoin) technologies.

BACKGROUND OF INVENTION

Cryptography involves techniques for secure communication between two or more nodes. A node may include a mobile communication device, a tablet computer, a laptop computer, desktop, other forms of computing devices and communication devices, a server device in a network, a client device in a network, one or more nodes in a distributed network, routers, etc. The nodes may be associated with a natural person, a group of people such as employees of a company, a service provider such as a media streaming provider, a system such as a banking system, etc.

In some cases, the two or more nodes may be linked by a communications network that is unsecure. For example, the two nodes may be linked by a communications network where a third party may be able to eavesdrop on the communication between the nodes. Therefore, messages sent between nodes can be sent in encrypted form and where, upon receipt, the intended recipients may decrypt the messages with corresponding decryption key(s) (or other decryption methods). Thus the security of such communication may be dependent on preventing a third party from determining the corresponding decryption key.

One method of cryptography includes using symmetric-key algorithms. The keys are symmetric in the sense that the same symmetric-key is used for both encryption of a plain text message and decryption of cipher text. One consideration of using symmetric-key algorithms is how to transmit the symmetric-key to both nodes in a secure way to prevent an eavesdropper from acquiring the symmetric-key. This may include, for example, physically delivering the symmetric-key to the (authorised) nodes so that the symmetric-key is never transmitted over an unsecure communications network. However, physical delivery in not always an option. Therefore a problem in such cryptographic systems is the establishment of the symmetric-key (which may be based on a common secret) between the nodes across an unsecure network. In recent times, situations may make it desirable that transmission of keys is usually done electronically over communications systems such as the internet. Thus this step of providing a shared secret (e.g. the symmetric-key) is a potentially catastrophic vulnerability. As the symmetric-key algorithms (and protocols) are simple and widely used, there is a need for an ability for two nodes to determine a common secret key securely across an unsecure network.

Another method of cryptography is a stream algorithm in which a symmetric-key is used as a seed for a pseudo-random number generator and output from the pseudo-random number generator is combined with a data stream, such as by using an exclusive or (XOR) operation, to produce a stream cipher. The recipient uses the symmetric-key to decrypt the stream cipher. EP1063811 describes an example of such a method which utilises a symmetric key approach for seeding a pseudo-random number generator. However, again the security of such a system can be dependent on transmission of the symmetric-key to both nodes in a secure way to prevent an eavesdropper from acquiring the symmetric-key.

Other existing cryptography methods include using asymmetric-keys. These may be used in public-key cryptography where the asymmetric-keys include a private key and a corresponding public key. The public key may be made publicly available whereas the private key, as the name implies, is kept private. These asymmetric-keys may be used for public-key encryption and for digital signature amongst other things. Existing protocols include the Diffie-Hellman Key Exchange and the Three Pass Protocol which enable the secure sharing of a secret across unsecure networks. Chapter 12 of the Handbook of Applied Cryptography (A. Menezes, P. van Oorschot, and S. Vanstone, CRC Press, 1996) discusses several known key establishment protocols and includes a discussion of secret sharing using asymmetric-keys. However these methods are computationally expensive in some cases, such as where new secrets are to be continuously generated and shared. Furthermore, these methods are not well adapted for high speed encryption, data transfer, and decryption such as required in data streaming applications. Further still, methods for managing asymmetric key hierarchies (such as described in the Bitcoin Developer's Guide) relying, for example, on a random seed and an index structure are inefficient and are not suited to generation of deterministic hierarchical shared secrets which are provably associated with specific data.

In light of the above, it will be appreciated that one technical problem with prior art configurations for implementing cryptographic data transfer, and usually the most important consideration, is that of security. Another technical problem with prior art configurations for implementing cryptographic data transfer for certain applications, such as streaming and larger data transfers, is that of speed. Yet another technical problem with prior art configurations for implementing cryptographic data transfer is that of ease of use in terms of set up/subscription, key management, and general usability of the system.

The aforementioned technical problems can be interrelated and there can often be a trade-off between desired characteristics of a system. For example, certain systems may be highly secure but slow and unsuitable for streaming data or large data transfers. Other systems may be fast but susceptible to hacking. Other systems may be relatively secure and fast but difficult to set up, use and/or manage in real world applications.

It is an aim of embodiments of the present invention to provide technical solutions to these problems.

SUMMARY OF INVENTION

A computer-implemented method of encrypting and transmitting data from a first node to a second node over a network is described herein, the method comprising:
deriving, at the first node, a secret key from a common secret which is known by the first and second nodes;
utilizing the secret key as a seed for a pseudo random number generator;
combining output from the pseudo random number generator with data to be transmitted to produce encrypted data; and
transmitting the encrypted data to the second node.

According to one configuration, the first node is associated with a first asymmetric cryptography key pair and the second node is associated with a second asymmetric cryptography key pair, and the common secret is derived at the first and second nodes from the respective first and second asymmetric cryptography key pairs without requiring transmission of the common secret between the first and second nodes. Encrypted data can be transmitted as a pseudo random bit stream.

Methodologies as described herein combine an improved method of sharing a common secret with a streaming algorithm to provide a highly secure, high speed encryption methodology suitable for applications such as media streaming, streamed virtual private network (VPN) services, large file transfers and the like.

Methodologies as described herein also combine an improved method of generating a set of different symmetric keys for a plurality of users with a streaming algorithm for a service provider to transmit data to a plurality of users.

Methodologies as described herein also provide an improved seeding method for a pseudo-random number generator used in an encryption method such as applied in a streaming algorithm. Methodologies as described herein also provide a highly secure, high speed, single use encryption system.

Embodiments can be provided in a variety of forms. For example, a computer readable storage medium can be provided which comprising computer-executable instructions which, when executed, configure one or more processors to perform the method as described herein. An electronic device can also be provided which comprises: an interface device; one or more processor(s) coupled to the interface device; and a memory coupled to the one or more processor(s), the memory having stored thereon computer executable instructions which, when executed, configure the one or more processor(s) to perform the method as described herein. Further still, a node of a blockchain network can be provided, the node configured to perform the method as described herein.

It should be noted that embodiments of the present invention utilize certain features of two very different types of cryptography. Using asymmetric keys for the secure sharing of a secret across an unsecure network is known. Furthermore, it is known to use a symmetric-key as a seed for a pseudo-random number generator and combine the output from the pseudo-random number generator with a data stream to produce a stream cipher. What is neither disclosed nor suggested in the prior art discussed in the background section is to utilise a secret key derived from a common secret which is known by two different nodes on a network (the common secret being derivable by the nodes using an asymmetric key for example) as a seed for a pseudo-random number generator and combining output from the pseudo-random number generator with data to be transmitted to produce encrypted data which is then transmitted from a first node to a second node over the network. Prior art methods of streaming data use a symmetric key protocol. The use of an asymmetric key protocol for streaming data is novel over such conventional symmetric key streaming protocols. Furthermore, the methodology as described herein is advantageous as it can provide a method which is more secure while also retaining high speed encryption suitable for streaming and large data transfers. In addition, embodiments as described herein are easy to set up, use, and manage in real world applications. For example, the methodology can be used for streaming/transmitting data from a blockchain, e.g. to provide a blockchain media streaming system in which media such as films and TV shows are saved on the blockchain and can be securely streamed to end users on request. Such a system also enables secure automated payment for a requested service via cryptographic currency transfer, e.g. bitcoin. These advantageous features are neither disclosed nor suggested in the prior art discussed in the background section.

BRIEF DESCRIPTION OF THE DRAWINGS

These and other aspects of the present invention will be apparent from and elucidated with reference to, the embodiments described herein. Embodiments of the present invention will now be described, by way of example only, and with reference to the accompany drawings, in which.

DETAILED DESCRIPTION

A method, device, and system to determine a common secret (CS) at a first node that is the same common secret at a second node will now be described.

Figure 1:
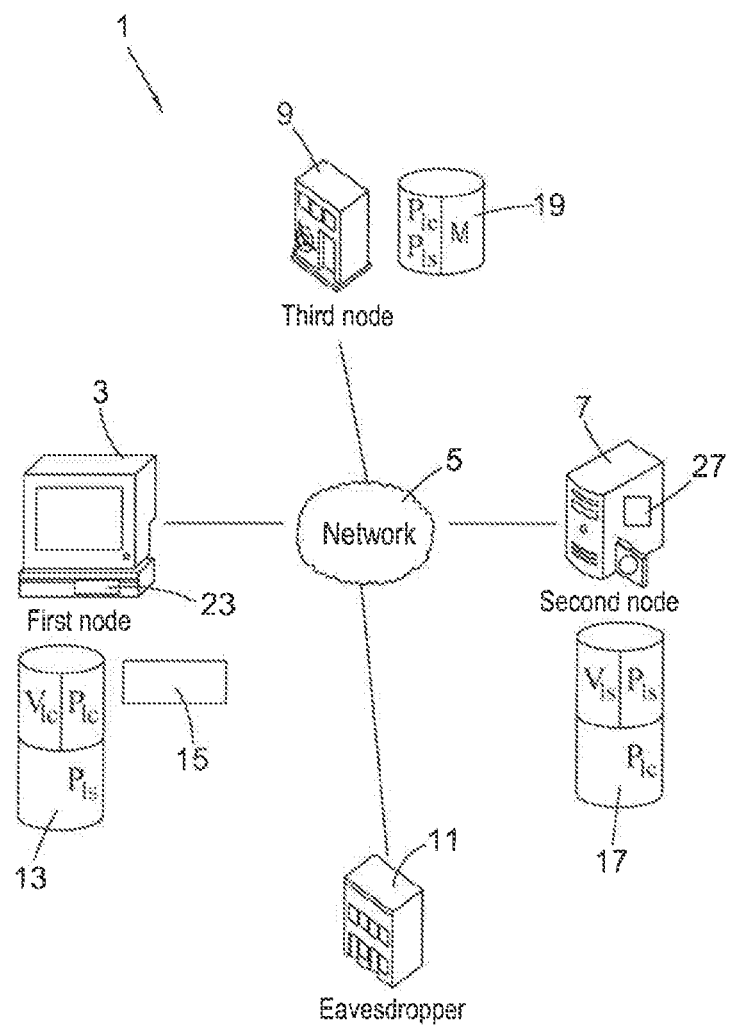
FIG. 1 is a schematic diagram of an example system to determine a common secret for a first node and a second node.

FIG. 1 illustrates a system 1 that includes a first node 3 that is in communication with, over a communications network 5, a second node 7. The first node 3 has an associated first processing device 23 and the second node 7 has an associated second processing device 27. The first and second nodes 3, 7 may include an electronic device, such as a computer, tablet computer, mobile communication device, computer server, etc. In one example, the first node 3 may be a client device and the second node 7 may be a server, or vice versa. The first and second nodes can have associated data stores 13, 17 and, optionally, a user interface 15. The system as illustrated in FIG. 1 also include a third node 9 having an associated data store 19 and further includes an eavesdropper 11. The system 1 may form part of a blockchain network.

The first node 3 is associated with a first asymmetric cryptography key pair having a first node master private key ($V_{1C}$) and a first node master public key ($P_{1C}$). The first node master public key ($P_{1C}$) is determined based on elliptic curve point multiplication of the first node master private key ($V_{1C}$) and a common generator (G) according to the formula:

$$P_{1C} = V_{1C} \times G \qquad \text{(Equation 1)}$$

The common generator G may be selected, randomly generated, or assigned. The first asymmetric cryptography pair includes:

$V_{1C}$: The first node master private key that is kept secret by the first node.

$P_{1C}$: The first node master public key that is made publicly known.

Similar to the first node 3, the second node 7 is associated with a second asymmetric cryptography pair having a second node master private key ($V_{1S}$) and a second node master public key ($P_{1S}$). The second node master public key ($P_{1S}$) is determined by the following formula:

$$P_{1S} = V_{1S} \times G \qquad \text{(Equation 2)}$$

Thus the second asymmetric cryptography pair includes:

$V_{1S}$: The second node master private key that is kept secret by the second node.

$P_{1S}$: The second node master public key that is made publicly known.

To determine a common secret (CS) at both the first node 3 and second node 7, the nodes 3, 7 perform steps as described below without communicating private keys over the communications network 5.

Initiation and Determining a Common Secret

Figure 2:
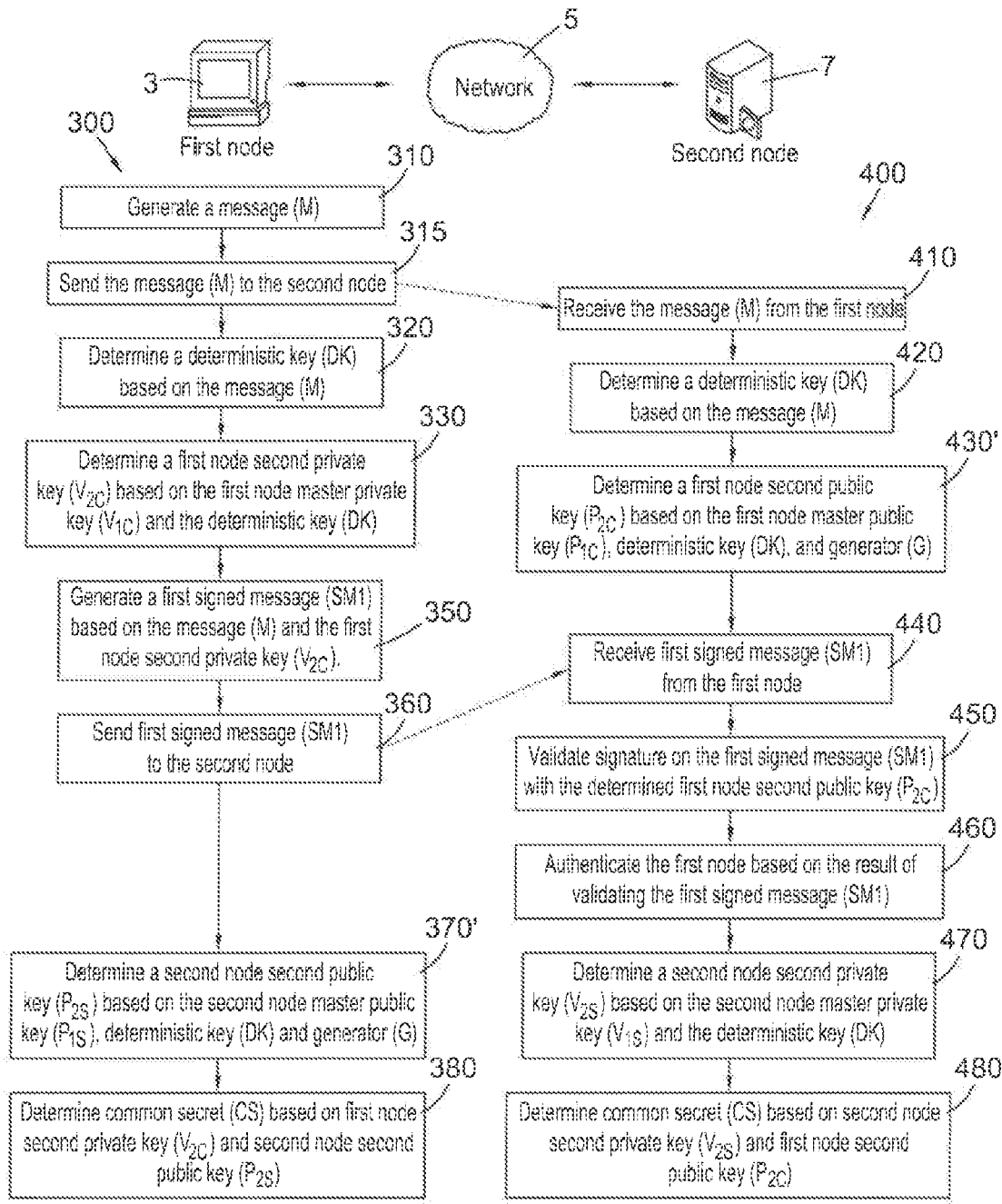
FIG. 2 is a flow chart of a computer-implemented method for determining a common secret.

An example of determining a common secret (CS) will now be described with reference to FIG. 2. The common secret (CS) may be used for a particular session, time, transaction, data transmission, or other purpose between the first node 3 and the second node 7 and it may not be desirable, or secure, to re-use the same common secret (CS). Thus the common secret (CS) may be changed between different sessions, time, transactions, data streaming applications, etc.

In this example, the method 300 performed by the first node 3 includes generating 310 a message (M). The message (M) may be random, pseudo random, or user defined. In one example, the message (M) is based on Unix time and a nonce (an arbitrary value). For example, the message (M) may be provided as:

$$\text{Message } (M) = \text{UnixTime} + \text{nonce} \qquad \text{(Equation 3)}$$

In some examples, the message (M) is arbitrary. However it is to be appreciated that the message (M) may have selective values (such as Unix Time, etc) that may be useful in some applications.

The method 300 includes sending 315 the message (M), over the communications network 5, to the second node 7. The message (M) may be sent over an unsecure network as the message (M) does not include information on the private keys.

The method 300 further includes the step of determining 320 a deterministic key (DK) based on the message (M). In this example, this includes determining a cryptographic hash of the message. An example of a cryptographic hash algorithm includes SHA-256 to create a 256-bit deterministic key (DK). That is:

$$DK = \text{SHA-256}(M) \qquad \text{(Equation 4)}$$

It is to be appreciated that other hash algorithms may be used.

The method 300 then includes the step 330 of determining 330 the first node second private key ($V_{2C}$) based on the second node master private key ($V_{1C}$) and the deterministic key (DK). This can be based on a scalar addition of the first node master private key ($V_{1C}$) and the deterministic key (DK) according to the following formula:

$$V_{2C} = V_{1C} + DK \qquad \text{(Equation 5)}$$

Thus the first node second private key ($V_{2C}$) is not a random value but is instead deterministically derived from the first node master private key. The corresponding public key in the cryptographic pair, namely the first node second public key ($P_{2C}$), has the following relationship:

$$P_{2C} = V_{2C} \times G \qquad \text{(Equation 6)}$$

Substitution of $V_{2C}$ from Equation 5 into Equation 6 provides:

$$P_{2C} = (V_{1C} + DK) \times G \qquad \text{(Equation 7)}$$

Where the "+" operator refers to scalar addition and the "×" operator refers to elliptic curve point multiplication. Noting that since elliptic curve cryptography algebra is distributive, Equation 7 may be expressed as:

$$P_{2C} = V_{1C} \times G + DK \times G \qquad \text{(Equation 8)}$$

Finally, Equation 1 may be substituted into Equation 8 to provide:

$$P_{2C} = P_{1C} + DK \times G \qquad \text{(Equation 9.1)}$$

$$P_{2C} = P_{1C} + \text{SHA-256}(M) \times G \qquad \text{(Equation 9.2)}$$

In equations 8 to 9.2, the "+" operator refers to elliptic curve point addition. Thus the corresponding first node second public key ($P_{2C}$) can be derivable given knowledge of the first node master public key ($P_{1C}$) and the message (M). The second node 7 may have such knowledge to independently determine the first node second public key ($P_{2C}$) as will be discussed in further detail below with respect to the method 400.

The method 300 further includes generating 350 a first signed message (SM1) based on the message (M) and the determined first node second private key ($V_{2C}$). Generating a signed message includes applying a digital signature algorithm to digitally sign the message (M). In one example, this includes applying the first node second private key ($V_{2C}$) to the message in an Elliptic Curve Digital Signature Algorithm (ECDSA) to obtain the first signed message (SM1).

The first signed message (SM1) can be verified with the corresponding first node second public key ($P_{2C}$) at the second node 7. This verification of the first signed message (SM1) may be used by the second node 7 to authenticate the first node 3, which will be discussed in the method 400 below.

The first node 3 may then determine 370 a second node second public key ($P_{2S}$). As discussed above, the second node second public key ($P_{2S}$) may be based at least on the second node master public key ($P_{1S}$) and the deterministic key (DK). In this example, since the public key is determined 370' as the private key with elliptic curve point multiplication with the generator (G), the second node second public key ($P_{2S}$) can be expressed, in a fashion similar to Equations 6, as:

$$P_{2S} = V_{2S} \times G \qquad \text{(Equation 10.1)}$$

$$P_{2S} = P_{1S} + DK \times G \qquad \text{(Equation 10.2)}$$

It is to be appreciated that the first node 3 can determine 370' the second node second public key independently of the second node 7.

The first node 3 can then determine 380 the common secret (CS) based on the determined first node second private key ($V_{2C}$) and the determined second node second public key ($P_{2S}$). The common secret (CS) may be determined by the first node 3 by the following formula:

$$CS = V_{2C} \times P_{2S} \qquad \text{(Equation 11)}$$

The corresponding method 400 performed at the second node 7 will now be described. It is to be appreciated that some of these steps are similar to those discussed above which are performed by the first node 3.

The method 400 includes receiving 410 the message (M), over the communications network 5, from the first node 3. This may include the message (M) sent by the first node 3 at step 315. The second node 7 then determines 420 a deterministic key (DK) based on the message (M). The step of determining 420 the deterministic key (DK) by the second node 7 is similar to the step 320 performed by the first node described above. In this example, the second node 7 performs this determining step 420 independent of the first node 3.

The next step includes determining 430' a first node second public key ($P_{2C}$) based on the first node master public key ($P_{1C}$) and the deterministic key (DK). In this example, since the public key is determined 430' as the private key with elliptic curve point multiplication with the generator (G), the first node second public key ($P_{2C}$) can be expressed, in a fashion similar to Equation 9, as:

$$P_{2C} = V_{2C} \times G \qquad \text{(Equation 12.1)}$$

$$P_{2C} = P_{1C} + DK \times G \qquad \text{(Equation 12.2)}$$

The method 400 may include steps performed by the second node 7 to authenticate that the alleged first node 3, is the first node 3. As discussed previously, this includes receiving 440 the first signed message (SM1) from the first node 3. The second node 7 may then validate 450 the signature on the first signed message (SM1) with the first node second public key ($P_{2C}$) that was determined at step 430.

Verifying the digital signature may be done in accordance with an Elliptic Curve Digital Signature Algorithm (ECDSA) as discussed above. Importantly, the first signed message (SM1) that was signed with the first node second private key ($V_{2C}$) should only be correctly verified with the corresponding first node second public key ($P_{2C}$), since $V_{2C}$ and $P_{2C}$ form a cryptographic pair. Since these keys are deterministic on the first node master private key ($V_{1C}$) and the first node master public key ($P_{1C}$) that were generated at registration of the first node 3, verifying first signed message (SM1) can be used as a basis of authenticating that an alleged first node sending the first signed message (SM1) is the same first node 3 during registration. Thus the second node 7 may further perform the step of authenticating (460) the first node 3 based on the result of validating (450) the first signed message.

The above authentication may be suitable for scenarios where one of the two nodes are a trusted node and only one of the nodes need to be authenticated. For example, the first node 3 may be a client and the second node 7 may be a server trusted by the client. Thus the server (second node 7) may need to authenticate the credentials of the client (first node 3) in order to allow the client access to the server system. It may not be necessary for the server to be authenticate the credentials of the server to the client. However in some scenarios, it may be desirable for both nodes to be authenticated to each other, such as in a peer-to-peer scenario that will be described in another example below.

The method 400 may further include the second node 7 determining 470 a second node second private key ($V_{2S}$) based on the second node master private key ($V_{1S}$) and the deterministic key (DK). Similar to step 330 performed by the first node 3, the second node second private key ($V_{2S}$) can be based on a scalar addition of the second node master private key ($V_{1S}$) and the deterministic key (DK) according to the following formulas:

$$V_{2S} = V_{1S} + DK \qquad \text{(Equation 13.1)}$$

$$V_{2S} = V_{1S} + \text{SHA-256}(M) \qquad \text{(Equation 13.2)}$$

The second node 7 may then, independent of the first node 3, determine 480 the common secret (CS) based on the second node second private key ($V_{2S}$) and the first node second public key ($P_{2C}$) based on the following formula:

$$CS = V_{2S} \times P_{2C} \qquad \text{(Equation 14)}$$

Importantly, the common secret is derived independently without requiring transmission between the nodes. Furthermore, the nodes do not need to store the common secret (CS) as this can be re-determined based on the message (M). In some examples, the message(s) (M) used may be stored in data store 13, 17, 19 (or other data store) without the same level of security as required for the master private keys. In some examples, the message (M) may be publicly available. For some applications, the common secret (CS) could be stored in the first data store (13) associated with the first node provided the common secret (CS) is kept as secure as the first node master private key ($V_{1C}$).

The disclosed system also allows determination of multiple common secrets that may correspond to multiple secure secret keys based on a single master key cryptography pair. An advantage of this may be illustrated by the following example.

In situations where there are multiple sessions, each associated with multiple respective common secrets (CS), it may be desirable to have a record associated with those multiple sessions so that the respective common secrets (CS) can be re-determined for the future. In known systems, this may have required multiple secret keys to be stored in a secure data store, which may be expensive or inconvenient to maintain. In contrast, the present system has the master private keys kept secure at the respective first and second nodes, whilst the other deterministic keys, or message (M), may be stored either securely or insecurely. Despite the deterministic keys (DK), or message (M), being stored insecurely, the multiple common secrets (CS) are kept secure since the master private keys required to determine the common secrets are still secure.

Use of the Common Secret in a Symmetric-Key Algorithm

The common secret (CS) may be used as a secret key, or as the basis of a secret key in a symmetric-key algorithm for secure communication between the first node 3 and second node 7.

The common secret (CS) may be in the form of an elliptic curve point (xs, ys). This may be converted into a standard key format using standard publicly known operations agreed by the nodes 3, 7. For example, the xs value may be a 256-bit integer that could be used as a key for $AES_{256}$ encryption. It could also be converted into a 160-bit integer using RIPEMD160 for any applications requiring this length key.

Figure 3:
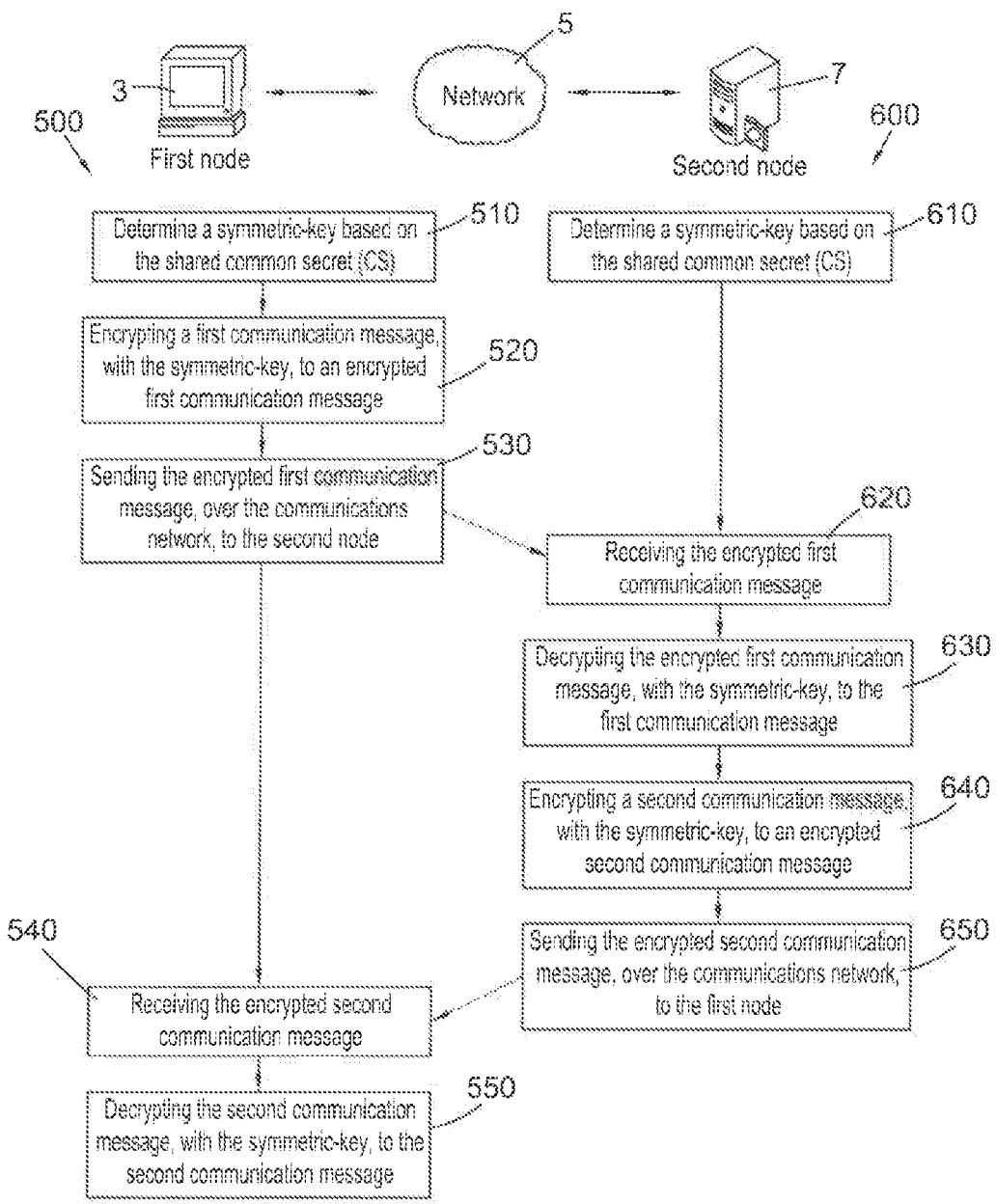
FIG. 3 is a flow chart of a computer-implemented method for secure communication between a first node and a second node.

Methods 500, 600 of secure communication between the first node 3 and second node 7 will now be described with reference to FIG. 3. The first node 3 determines 510 a symmetric-key based on the common secret (CS) determined in the method above. This may include converting the common secret (CS) to a standard key format. Similarly, the second node 7 can also determine 610 the symmetric-key based on the common secret (CS).

To send a first communication message securely from the first node 3, over the communications network, to the second node, the first communication message needs to be encrypted. Thus the symmetric-key is used by the first node for encrypting 520 a first communication message to form an encrypted first communication message, which is then sent 530, over the communications network 5, to the second node 7. The second node 7, in turn, receives 620 the encrypted first communication message 620, and decrypts 630 the encrypted first communication message, with the symmetric-key, to the first communication message.

Similarly, the second node 7 may encrypt 640 a second communication message, with the symmetric-key, to an encrypted second communication message, which is then sent 650 to the first node 3. The first node 3 may then receive 540 the encrypted second communication message, and decrypt 550 it to the second communication message.

Use of the Common Secret to Seed a Pseudo Random Number Generator (e.g. in a Streaming Algorithm)

Figure 4:
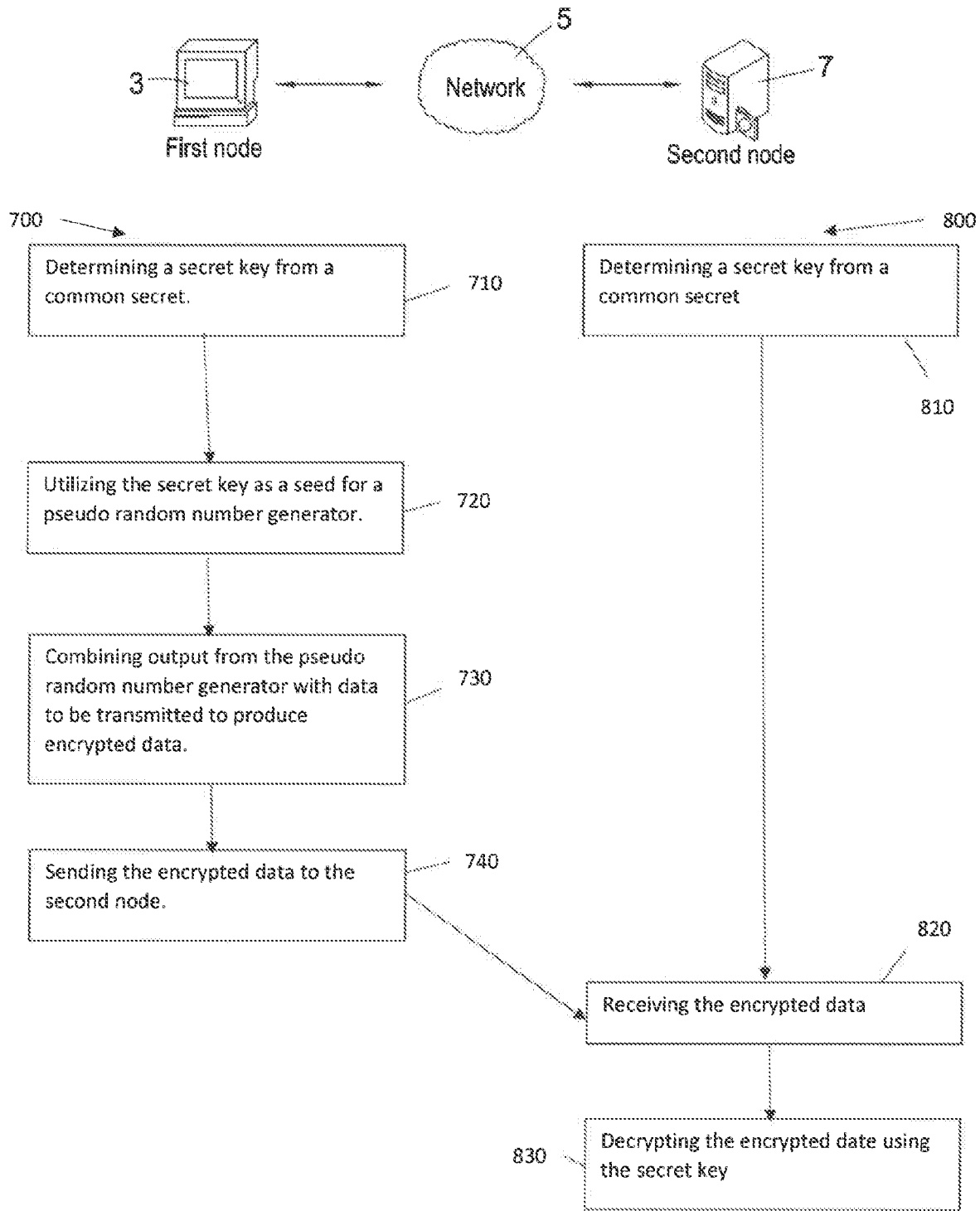
FIG. 4 is a flow chart of a computer-implemented method for secure communication between a first node and a second node which utilizes a pseudo random number generator.

Following on from the above, the common secret (CS) may be used as a secret key, or as the basis of a secret key, for seeding a pseudo-random number generator such as may be used in a streaming algorithm. Such a method 700 is illustrated in FIG. 4 and comprises:

- deriving, at the first node, a secret key from a common secret which is known by the first and second nodes 710;
- utilizing the secret key as a seed for a pseudo random number generator 720;
- combining output from the pseudo random number generator with data to be transmitted to produce encrypted data 730; and
- transmitting the encrypted data to the second node 740.

The second node also determines a corresponding secret key from the common secret 810. On reception of the encrypted data 820 the second node can then utilize the secret key to decrypt the data.

The secret key can be derived from a common secret by converting the format of the common secret into a desired asymmetric key format, e.g. the Advanced Encryption Standard (AES). This asymmetric key may be further combined with other data, e.g. by an exclusive or (XOR) operation. The other data may comprise a time variable or a cryptographic function (e.g. a hash) of a time variable. The time variable may be a time variable associated with a block height of a blockchain. For example, in bitcoin the CheckLockTimeVerify (CLTV) may be used to generate the time variable. In that case, CLTV is written to the blockchain and can be accessed from that point. In this way, a video stream for instance can be made available after the block is public, shared at the time.

A hash of the time variable can be calculated and combined with the asymmetric key (e.g. by an XOR operation) to define the secret key. The secret key may additional or alternatively be combined with a single use value which is hashed and combined (e.g. by an XOR operation) with the secret key. In this case, the single use value will be required to be exchanged between, or derived by, the two nodes party to the data transmission.

The pseudo random number generator can be a known pseudo random number generator such as based on a Zeta function (http://keisan.casio.com/exec/system/1180573439) or a Wolfram Rule 30 function (http://mathworld.wolfram.com/Rule30.html). The output of the pseudo random number generator can be combined with the data to be transmitted using an exclusive or (XOR) operation. The output of the pseudo random number generator may be used as a single use encryption, e.g. a one-time pad.

The transmitting of the encrypted data may comprise transmission of a pseudorandom bit stream. The pseudorandom bit stream can provide a VPN service or streamed media service. For example, the sender can be a service provider configured to transmit the combined data to a plurality of users using a different shared symmetric key for each user.

The data to be transmitted in this manner, or location information for the data to be transmitted, may be stored on a blockchain. For example, in bitcoin the OP_Return feature can be used to store such data.

The transmitting and receiving nodes can seed their own pseudo random number generators independently. As the method uses an effective one time pad (OTP) based on XOR'd random data, this is effectively hidden. Each node runs their own pseudo random number generator based on the seed allowing a stream of pseudo random data that can be followed in order from the time it is initiated. As the data is transmitted as a stream, errors in the XOR can be corrected later (encoding) or jumped/skipped (live video).

EXAMPLE

An example of the above described methodology is set out below as implemented using the bitcoin protocol:
(i) Message exchange, key generation, calculation of a common secret and derivation of a symmetric key (AES) is as previously described.
(ii) The bitcoin CheckLockTimeVerify (CLTV) opcode is used to generate a time variable associated with the time for a block height (or second).
(iii) From this, we can take the AES (symmetric key) and the time variable and calculate a secret key as follows:
1. H1=Hash-SHA256(Time)//gives a 256 bit #
2. SK=XOR (AES|H1)
3. Optionally, hash a single use value and XOR to SK
(iv) Use SK as an input variable for seeding a pseudo-RND (e.g. Wolfram Rule 30).
(v) The output returned by the pseudo-RND is combined, by XOR, with the file to be encrypted.
(vi) The encrypted file is transmitted, e.g. as a data stream.
(vii) As the recipient downloads the data it is decrypted via XOR using a corresponding SK derived from the common secret.

The above described method can provide each user with very fast single use encryption, effectively wire speed. This can be used to encrypt media streaming services with a separate key for each user. The methodology can be readily implemented in hardware. The XOR and pseudo-RND parts are simple and XOR as a gate effectively gives wire speed (even in 100 GB networks). This enables a device such as a router to run this methodology and it can even be used as a streamed VPN service (not just media or files). In such a VPN application, each VPN circuit can have a separate one time pad. Further still, and most importantly, the methodology results in a cryptographic process which cannot be cracked.

In the above described data transmission methodology, the seed for the pseudo-random number generator used in the data encryption algorithm is derived from a common secret which is itself calculated using the method described in the preceding section entitled "Initiation and determining a common secret". This approach is particularly secure as the common secret is not transmitted between nodes over a network and thus cannot be intercepted by a third party. As pseudo-random number generators are deterministic, if the seed is compromised then the system can potentially be hacked. In contrast, as the present method provides a means by which the common secret/secret key is independently derived at nodes in the system, the approach provides an improved seeding method for a pseudo-random number generator used in an encryption process such as used in a stream cipher. Furthermore, the approach provides an efficient means of generating a set of different symmetric keys for a plurality of users which can then be used in a streaming algorithm for a service provider to transmit data to a plurality of users. Thus, methodologies as described herein combine an improved method of deriving a common secret with a streaming algorithm to provide a highly secure, high speed encryption methodology suitable for applications such as media streaming, streamed virtual private network (VPN) services, large file transfers, and the like.

In addition to the above, it is also envisaged that the seeding methodology for a streaming algorithm or other encrypted file transfer may use a secret key which is not generated from a common secret calculated by the method described in the preceding section entitled "Initiation and determining a common secret". In this regard, the data transmission can be made more secure by using additional data, preferably single use data, in combination with a symmetric key to derive the secret key. As such, even if the secret key was previously intercepted this cannot, in itself, be used to decrypt the data transmission. For example, the method for encrypting data and transmitting the encrypted data from a first node to a second node may comprise:

deriving, at the first node, a secret key by combining a symmetric key with additional data for an encrypted data transmission;
utilizing the secret key as a seed for a pseudo random number generator;
combining output of the pseudo random number generator with data to be transmitted to produce encrypted data; and
transmitting the encrypted data to the second node.

The second node also determines a corresponding secret key from a common symmetric key and additional data. On reception of the encrypted data the second node can then utilize the secret key to decrypt the data.

The additional data may be a time variable such as a blockchain time variable or cryptographic function thereof (e.g. a hash) as previously discussed and may be combined with the secret key using an XOR operation. Additionally, or alternatively, the additional data includes a single use value or a cryptographic function of a single use value. A single use value may be combined with the symmetric key (e.g. via an XOR operation) to derive the secret key to be used as a seed for a pseudo-RND. The additional data can be exchanged between the first and second nodes to enable decryption of the data signal. Alternatively, the additional data can be derivable by the first and second nodes without requiring transmission of the additional data between the nodes. For example, the additional data could be derived using the scheme previously described for use in generating a common secret.

It will be appreciated by persons skilled in the art that numerous variations and/or modifications may be made to the above-described embodiments, without departing from the scope of the present invention as defined by the appended claims.

What is claimed is:

1. A computer-implemented method of encrypting and transmitting data from a first node to a second node over a network, the method comprising:
    deriving, at the first node, a secret key from a common secret which is known by the first and second nodes;
    utilizing the secret key as a seed for a pseudo random number generator;
    combining output from the pseudo random number generator with data to be transmitted to produce encrypted data; and
    transmitting the encrypted data to the second node,
wherein the first node is associated with a first asymmetric cryptography key pair and the second node is associated with a second asymmetric cryptography key pair, and the common secret is derived at the first and second nodes from the respective first and second asymmetric cryptography key pairs without transmitting the common secret between the first and second nodes.

2. The method according to claim 1, wherein derivation of the secret key includes converting the common secret into a symmetric key.

3. The method according to claim 1, wherein derivation of the secret key includes combining the common secret, or the symmetric key of claim 2, with additional data for the encrypted data transmission.

4. The method according to claim 3, wherein the additional data is derived at the first and second nodes without transmitting the additional data between the first and second nodes.

5. The method according to claim 3, wherein the additional data includes a time variable or a cryptographic function of a time variable.

6. The method according to claim 3, wherein the additional data includes a single use value or a cryptographic function of a single use value.

7. The method according to claim 3, wherein the additional data is combined with the common secret or the symmetric key using an exclusive or (XOR) operation to produce the seed for the pseudo random number generator.

8. A method according to claim 3, wherein the additional data includes a time variable associated with a time for a block height of a blockchain, or a cryptographic function of a time variable associated with a time for a block height of a blockchain.

9. The method according to claim 1, wherein the pseudo random number generator is based on a Zeta function or a Wolfram Rule 30 function.

10. The method according to claim 1, wherein the output of the pseudo random number generator is combined with the data to be transmitted using an exclusive or (XOR) operation to produce the encrypted data.

11. The method according to claim 1, wherein the output of the pseudo random number generator is used as a one-time pad.

12. The method according to claim 1, wherein the transmitting of the encrypted data comprises transmission of a pseudorandom bit stream.

13. The method according to claim 12, wherein the pseudorandom bit stream is one or more of a virtual private network (VPN) service or a streamed data service.

14. The method according to claim 1, wherein the first node is a service provider configured to transmit encrypted data to a plurality of users using a different shared symmetric key for each user.

15. The method according to claim 1, wherein the second node receives the encrypted data and decrypts the data using the common secret.

16. The method according to claim 1, wherein the second node decrypts the encrypted data as it is being received by applying an exclusive or (XOR) operation to the encrypted data as it is being received.

17. The method according to claim 1, wherein the second node seeds its own pseudo random number generator independently of the first node in order to decrypt the encrypted data.

18. A non-transitory computer readable storage medium comprising computer-executable instructions that, when executed, configure one or more processors to:
   derive, at a first node, a secret key from a common secret which is known by the first node and a second node;
   utilize the secret key as a seed for a pseudo random number generator;
   combine output from the pseudo random number generator with data to be transmitted to produce encrypted data; and
   transmit the encrypted data to the second node,
wherein the first node is associated with a first asymmetric cryptography key pair and the second node is associated with a second asymmetric cryptography key pair, and the common secret is derived at the first and second nodes from the respective first and second asymmetric cryptography key pairs without transmitting the common secret between the first and second nodes.

19. A system comprising:
   an interface device;
   one or more processors coupled to the interface device; and
   a memory coupled to the one or more processors, the memory having stored thereon computer executable instructions that, when executed, configure the one or more processors to:
   derive, at a first node, a secret key from a common secret which is known by the first node and a second node;
   utilize the secret key as a seed for a pseudo random number generator;
   combine output from the pseudo random number generator with data to be transmitted to produce encrypted data; and
   transmit the encrypted data to the second node,
wherein the first node is associated with a first asymmetric cryptography key pair and the second node is associated with a second asymmetric cryptography key pair, and the common secret is derived at the first and second nodes from the respective first and second asymmetric cryptography key pairs without transmitting the common secret between the first and second nodes.

20. The system of claim 19, wherein the first node is of a blockchain network.

* * * * *